R. R. BOWERS.
COMBINED RAKE AND TEDDER.
APPLICATION FILED MAR. 12, 1920.

1,406,970.

Patented Feb. 21, 1922.
3 SHEETS—SHEET 2.

UNITED STATES PATENT OFFICE.

ROBERT R. BOWERS, OF OTTUMWA, IOWA, ASSIGNOR TO THE DAIN MANUFACTURING COMPANY OF IOWA, OF OTTUMWA, IOWA, A CORPORATION OF IOWA.

COMBINED RAKE AND TEDDER.

1,406,970.  Specification of Letters Patent.  Patented Feb. 21, 1922.

Application filed March 12, 1920. Serial No. 365,166.

*To all whom it may concern:*

Be it known that I, ROBERT R. BOWERS, a citizen of the United States, and a resident of Ottumwa, in the county of Wapello and State of Iowa, have invented certain new and useful Improvements in Combined Rakes and Tedders, of which the following is a specification, reference being had to the accompanying drawings.

This invention relates to that type of side-delivery rotary rakes wherein is journaled in a suitable diagonally-arranged frame a rotary reel that is provided with a plurality of rows of raking teeth all of which are maintained at substantially the same angle so as to be presented alike to the hay on the ground. Said several rows of teeth are held in the desired working position by means of suitable mechanism that is carried by the forward or inner reel-head, such mechanism ordinarily comprising a set of gears in connection with the bar to which each row of rake-teeth is connected and a single other gear that is disposed centrally of the several sets and is in constant mesh with the inner gear of each of said sets.

It is the leading object of this invention to provide improved means for readily and easily changing the direction of rotation of the said reel so that the machine may be alternatively employed as a rake to gather the hay into windrows or as to tedder to scatter it for drying. Another object is to so construct the machine that in addition to the ordinary vertical adjustment that is provided for the outer or rear end of the reel by a bodily movement of its frame with respect to the usual supporting caster-wheel or wheels an independent vertical movement for adjusting purposes can be given to the reel itself when the machine is in use either as a rake or as a tedder. These objects I attain by the construction and arrangements of parts shown in the drawings and hereinafter particularly pointed out. That which I believe to be new will be set forth in the claims.

Referring to the several figures of the drawings, 10—10 indicate a pair of carrying wheels mounted upon an axle 11 and such axle will be so connected with the wheels as to be rotated during the forward movement of the machine but not rotated when the machine is backed. Such connecting means between an axle and a wheel are well understood in the art and, therefore, I have not deemed it necessary to here illustrate the same. 12 indicates an ordinary diagonally-disposed reel frame which is connected with the axle 11 so as to rock freely thereon when the frame is adjusted relatively to its usual rear ground-engaging support or supports. Two short sleeves 13 and 14, loose upon the axle 11, form bearings to which projecting portions of the frame 12 are attached for connecting the reel-frame with the axle. 15 indicates the usual long truss bar that extends from the axle 11 back over the reel-frame, to which frame it is connected near its rear end, the forward end of the bar being secured as usual to a sleeve 15ᵃ on the axle and thus constituting another rocking connection of the reel-frame to the axle. 16 indicates a bent supplemental frame section that is rigidly connected with and forms an extension of the reel-frame 12, said supplemental frame extending forward of the axle and furnishing means for the attachment of the usual draft devices. As shown, the machine is provided in the rear with two caster wheels 17 which serve to support the rear end of the reel-frame, and the reel-frame is adjustable vertically with reference to those caster wheels in any usual way. As shown, such adjustment is effected through the movement of the connected link and chain members 18 that are operated by an ordinary hand lever pivotally mounted on the truss bar 15 within convenient reach of the driver's seat,—certain of the chain members shown passing over pulleys supported in brackets adjacent to the standards of the caster wheels and connected with such standards. As such adjustment of the rear end of the reel-frame is common and well-known and may be accomplished by any well-known devices, I do not deem it necessary to here describe them any more in detail.

The reel that is rotatably mounted in the frame 12 comprises two heads connected together by a plurality of bars, to which bars the rake-teeth are connected in the usual manner. The inner or forward one of these reel-heads is indicated by 19 and the outer or rear reel-head is indicated by 20. The tooth bars above mentioned are indicated by 21 and, as is usually the case, three such bars will be employed. 22 indicates curved guards that are secured to the front and rear members of the reel-frame, their function being to strip from the reel teeth any hay that might tend to be carried around by the teeth.

While I have not shown any mechanism for controlling the positions of the tooth bars 21 so as to maintain the several sets of teeth that are carried by these bars in proper position, it is to be understood that, as usual, the inner or forward reel-head 19 will be provided with such mechanism, which mechanism will preferably consist of a plurality of sets of gears rotatably secured on the outer face of such head, one set being provided for each tooth bar and the outer gear of each set being keyed or otherwise secured to the forward end of one of the tooth bars as usual. Furthermore, upon the reel-shaft will be mounted a smaller gear which is normally held against rotation and with which one member of each of the several sets of gears before mentioned will be in constant mesh. I have not illustrated the arrangement of such gearing, as it forms no part of my present invention and is an arrangement well understood by those acquainted with this art. It is, however, very fully shown and described in Letters Patent, No. 886,681, dated May 5, 1908, granted to Joseph Dain, and while in said Dain patent such central gear is at all times held against independent rotation, I prefer to provide for a slight turning of such central gear in order to be able to vary the inclination of the several sets of rake-teeth and I, therefore, prefer to mount such central gear rotatably and control the amount of its rotation by means of an adjusting lever 23 that interlocks with a pivoted sector 24, which latter construction is very fully set forth in Letters Patent, No. 1,283,674, dated October 29, 1917, granted upon the application of one Leon R. Clausen. The central shaft, hereinbefore referred to, upon which the rotatable reel-frame is secured, is indicated by 25. This reel-shaft is preferably angular in cross-section, as shown, (see Fig. 4) and as its inner or forward end is capable of being adjusted up and down as hereinafter described, the bearing, indicated by 26, for the other end of the shaft must, of course, be large enough not to offer any obstruction to such adjustment. In other words, that outer end bearing must be so shaped as to permit a limited rising and falling movement of the shaft when the inner end of the shaft is vertically adjusted. Such inner or forward end of the reel-shaft is supported (see Fig. 4) in a bearing 27 that lies within an elongated opening 28 in a bracket 29 that depends from and is bolted to the inner or forward end member of the reel-frame 12. Formed with this bearing 27, in the construction shown, is an upwardly-extending arm 30 to which is bolted a hand lever 31 that is adjustably connected by the usual spring latch with a curved and notched rack 32 bolted to and rising from said end member of the reel-frame. The rear curved edge of the elongated opening 28 is toothed to provide a short rack and a portion of the circumference of the bearing 27 is provided with teeth that mesh with that rack, and it will be evident that by a movement of the lever 31 the bearing 27 can be adjusted up or down, with a consequent movement of the forward end of the reel-shaft, and the desired adjustment will be maintanied by the interlocking of the lever 31 with its curved rack 32. The width of the opening 28 is such that the bearing 27 therein cannot have its teeth disengaged from the short curved rack in the edge of the bracket.

Figures 1, 2:
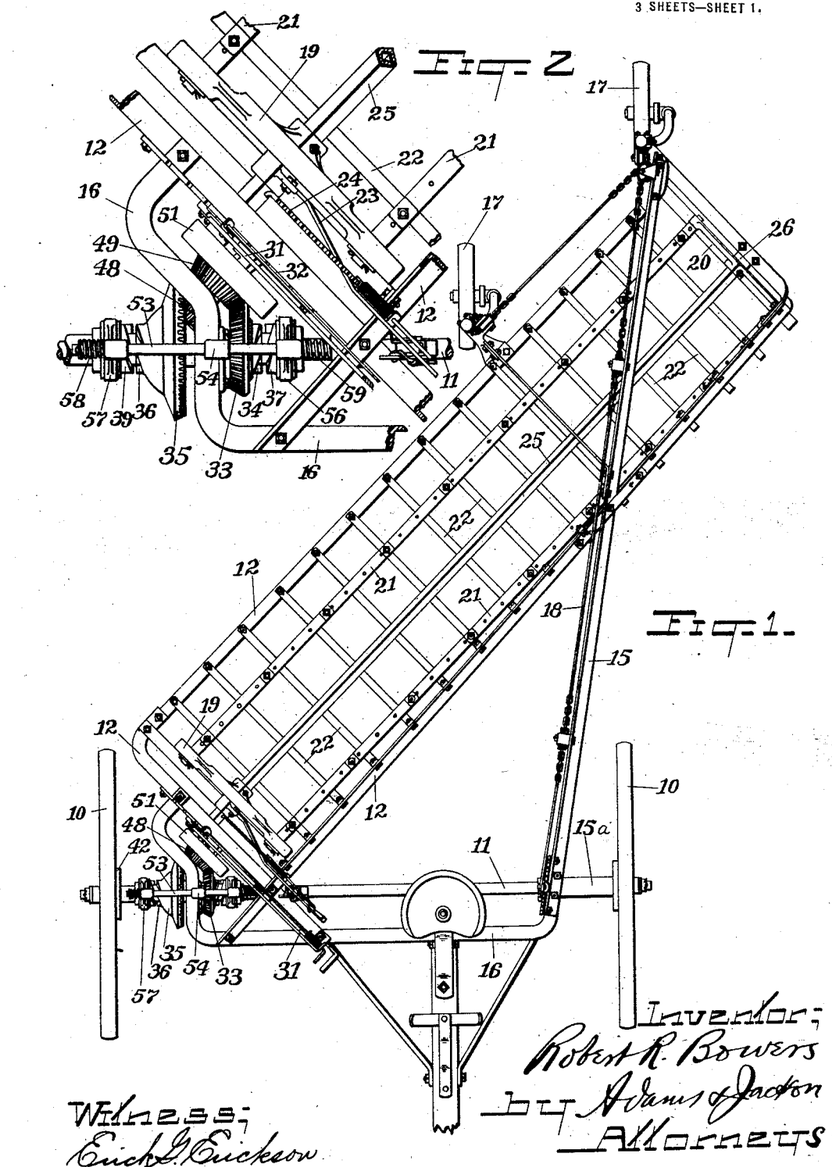
Fig. 1 is a plan view of a machine embodying my improvements.
Fig. 2 is a detail, being an enlarged plan view of a portion of the front end of the machine and illustrating the means for rotating the reel in either direction.

Turning now to the means by which the reel is driven—either forwardly to act as a rake or rearwardly to act as a tedder—33 indicates an ordinary bevel gear loosely mounted upon the axle 11 and having one end of its extended hub formed to constitue a clutch member 34. 35 indicates an internal bevel gear also loosely mounted on the axle 11 and located a short distance from the bevel gear 33,—this internal gear 35 also having an end portion of its extended hub formed, as in the case of the bevel gear 33, to constitute a clutch member which is indicated by 36. The two clutch members 34 and 36 face towards opposite ends of the axle 11. The two gears 33 and 35 are held spaced apart by the short sleeve portion of the bearing 13 against the ends of which the elongated hubs of the two gears abut. 37 indicates a clutch member slidably but non-rotatably mounted upon a short sleeve 37$^a$ on the axle 11, the non-rotation being accomplished, in the construction shown by ribs 37$^b$ formed on said sleeve, which ribs project into grooves in the inner face of the clutch member 37 (see Fig. 9). The sleeve 37$^a$ is held connected to the axle by a key 38. The clutch member 37 is adapted to be moved into and out of clutching engagement with the clutch member 34 so as to, at the will of the driver, connect the bevel gear 33 to or disconnect it from the axle 11. A similar sliding clutch member 39 is provided for cooperation with the clutch member 36 so as to connect the internal bevel gear 35 to or disconnect it from said axle. This clutch member 39 is slidably mounted upon a sleeve 40 that is keyed to the axle, and at its outer end such sleeve carries a short laterally-projecting arm 41 that, as shown, has a tooth or lug on its outer face which in intended for engagement with ratchet teeth in a drum 42 (shown in Fig. 1) carried by the adjacent wheel 10. As such construction is a common one I have not deemed it necessary to illustrate the said ratchet and the actual engagement of the arm therewith.

Figures 3, 4, 10, 11:
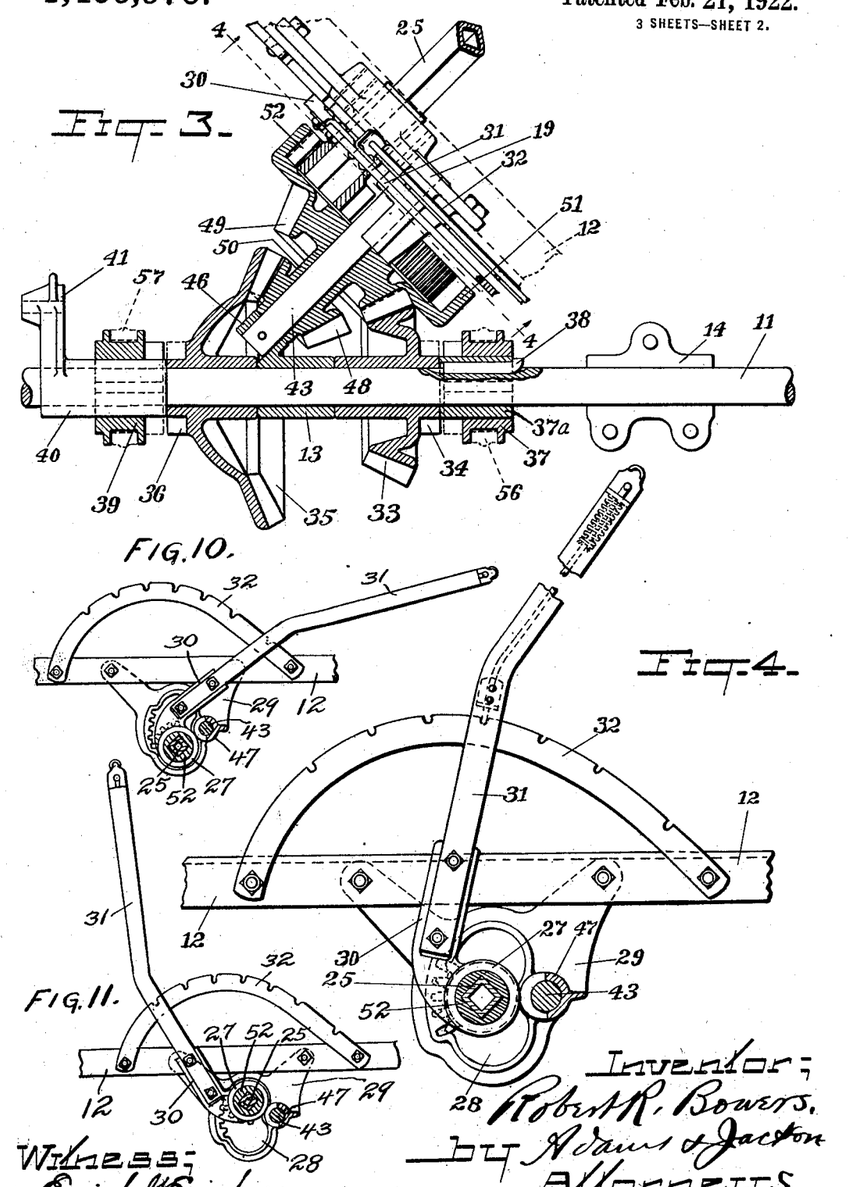
Fig. 3 is a horizontal sectional view of the reel-driving mechanism.
Fig. 4 is a vertical section taken at line 4—4 of Fig. 3, and showing in front elevation the lever mechanism by which the vertical adjustment of the inner end of the reel is effected.
Figs. 10 and 11 are views similar to Fig. 4, but on a smaller scale, and respectively showing the position of the parts when the forward end of the reel-shaft is adjusted to its lowest and highest positions.

43 indicates a short shaft extending diagonally rearward from the axle 11 with its axis substantially parallel with the axis of the reel-shaft 25. This short shaft 43 is supported at its forward end in a bearing 46 which is shown (see Fig. 3) integral with the sleeve member 13 and at its rear end it is supported in a bearing 47 carried by the depending bracket 29. Rotatably mounted upon this short shaft 43 is a bevel gear 48 that is in constant mesh with the internal bevel gear 35 and also upon such shaft is another bevel gear 49 which is in constant mesh with the bevel gear 33. As shown in Fig. 3, these two bevel gears 48 and 49 that are in axial alinement are connected together by a sleeve portion 50. Formed with the gear 49 and in rear of such gear is a comparatively large internal gear 51 which lies but a short distance from and substantially parallel with the forward or inner end member of the reel-frame 12. This internal gear 51 is so disposed as to permit the projection thereinto of the forward end of the reel-shaft 25 and upon such forward end of that shaft is secured a pinion 52 which is in constant mesh with the teeth of the internal gear 51, and it is by reason of such engagement that the reel-shaft and reel are rotated in either direction as hereinafter described.

In order to adapt the machine for use as an ordinary side-delivery rake, the sliding clutch member 37 is to be moved into engagement with the clutch member carried by the bevel gear 33, while to adapt the machine for use as a tedder the clutch member 39 is brought into engagement with the clutch member 36 carried by the internal gear 35, and the means that are employed for effecting either of these clutching engagements are as follows: a longitudinally-movable bar 53 (see Fig. 5) is supported over the axle 11 in bearings 54 and 55, which bearings are suitably supported from the axle 11 and the framework of the machine. The bar 53 is bent as shown in order to pass over the gear members 33 and 35 on the axle. Secured to the bar in the proper position to suitably engage the movable clutch members 37 and 39 are yokes 56 and 57 respectively and on the end portion of the bar that projects beyond the yoke 57 is a coiled spring 58 that bears at one end against the yoke 57 and at its other end against a pin passing through the bar. Between the yoke 56 and the end of the bearing 55 is another coiled spring, indicated by 59. To the inner end of the longitudinally-movable bar 53 is pivotally connected a hand lever 60, the attachment of the hand lever to the bar being by means of a heavy pin 61 upon which pin is also journaled a block 62.

Figures 5, 6, 9:
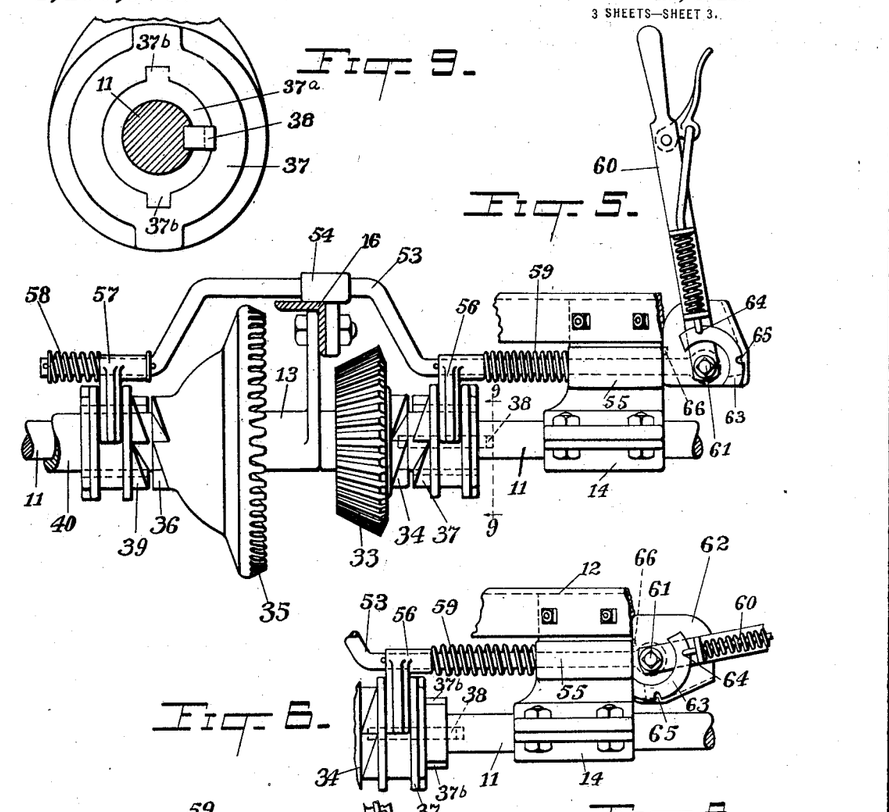
Fig. 5 is a detail, being a front elevation of the gear and clutch devices located on the axle of the machine and by means of which the machine can be operated either as a rake or a tedder, the clutch-shifting devices being also shown—the clutches being shown in neutral or non-operative position.
Fig. 6 is a detail illustrating in front elevation the position of the clutch-shifting lever and parts connected therewith, said lever being in position to cause a locking to the axle of that member of the gearing that compels a forward rotation of the reel for raking action.
Fig. 9 is a cross-section through the axle of the machine, such section being taken at line 9—9 of Fig. 5.
Figure 7:
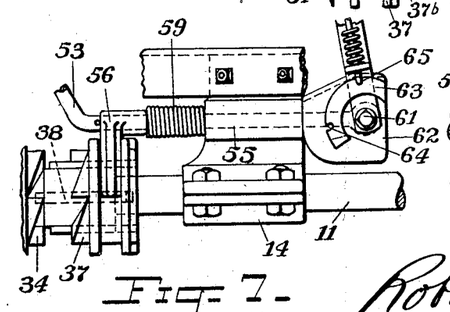
Fig. 7 is a view similar to Fig. 6 but with the parts in position to compel the machine to operate as a tedder.
Figure 8:
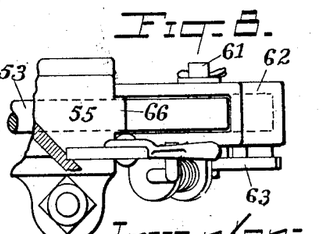
Fig. 8 is a plan view of the clutch-shifting lever and certain parts connected therewith.

This block, as best shown in Fig. 8, is a structure that comprises two side walls spaced apart and connected at their outer ends by an end wall, and it is so disposed that the two side walls referred to lie on opposite sides of the inner end portion of the bar 53—the lever 60 lying alongside one of the side walls of the bar. To the side wall last referred to is rigidly secured a notched segment 63 having, in the construction shown, two notches therein, indicated respectively by 64 and 65, with either of which the spring-pressed latch of the lever 60 is adapted to engage. By turning the block 62 by means of the lever 60 either of the movable clutch members 37—39 can be caused to move into clutching engagement with its cooperating member. For example, with the mechanism in the position represented by Fig. 5 where both of the clutch devices are shown in neutral or inoperative position, a downward stroke of the lever to the position shown in Fig. 6 will cause a turning of the block 62 so as to bring what was formerly its lower edge into position against the end of the bearing 55,—the coiled springs 58 and 59 yielding sufficiently to permit the bar 53 to move endwise as the block turns to this position. Such turning of the block into the position shown in Fig. 6 will cause a clutching engagement of the clutch 37 with the gear 33 and the force of the spring 59 will hold the block 62 in its new position and insure the continuation of the clutching engagement last mentioned. If, however, instead of having the gear 33 clutched to the axle in the manner described, and which will cause the machine to act as a rake, it be desired to clutch the internal bevel gear 33 to the axle, the latch of the lever 60 is to be released from the notch 64, as it is shown in Fig. 5, and the lever then turned down and its latch caused to engage the notch 65 after which an upward pull on the lever will cause a turning of the block into the position shown in Fig. 7 whereby the bar 53 will be drawn lengthwise inward—that is, toward the driver on his seat—causing the sliding clutch member 39 to engage the clutch member of the internal bevel gear 35, and of course carrying the other sliding clutch member 37 to a distance from the clutch member of the bevel gear 33, as seen in Fig. 7. These endwise movements of the bar 53 and consequent shifting of the movable clutch members as described, are permitted and compelled by reason of the location of the pivot pin 61 with respect to the block through which it passes. As shown, the location of this pivot pin is quite close to one of the bearing edges of the block and at a very considerable distance from the other bearing edges and such block may, therefore, be said to constitute an eccentric, and as such it will, when moving to one position, force the bar longitudinally in one direction and when moving to another position draw the bar in the opposite direction, and when seated along any one of its three acting edges against the end of the bearing 55 will, under the influence of the coiled springs, firmly hold one only of such clutches in clutching engagement as described. To prevent any axial turning of the bar 53 and the lever 60 and the block 62 connected therewith, I provide a projection 66 on the end of the bearing 55 of sufficient width to extend into the space between the side walls of the block 62—see Fig. 8. In whichever adjusted position that the block is turned to such projection will extend between the side walls thereof and effectually prevent any tendency of the bar 53 and attached parts to rotate,—thus insuring the hand lever 60 always being in proper position for operation by the driver while on the seat.

The machine will be driven to and from a field where it is to be operated, with the clutch-adjusting mechanism in the neutral or inoperative relation shown in Fig. 5. When the machine is ready for use the lever 60 will be operated in the manner described to cause a clutching engagement with the axle 11 of either the bevel gear 33 or the internal bevel gear 35, depending upon whether the machine is to be used as a rake or as a tedder. If the bevel gear 33 is engaged by the sliding clutch member 37 the machine will operate as a rake due to the fact that the bevel gear 49 is rotated in the proper direction to effect a forward rotation of the reel-shaft 25 through the intermeshing of the gear 52 on its end with the internal gear 51 that, in the construction shown, is integral with the bevel gear 49. It will be evident also that a reverse rotation of the reel-shaft will be effected so as to cause the machine to act as a tedder, when the internal gear 35 is clutched to the axle 11, this reverse rotation being due, as will be readily understood, to the fact that the power is applied to the connected parts 48, 49, 50 and 51 at the same side of the axle as in the other case but applied by means of an internal gear. It will also be understood that by reason of the two gears 48 and 49 being connected together and such gears being in constant mesh with the gears 35 and 33 respectively, that that one of the gears 33—35 that is not in clutching engagement with the axle will, of course, be rotated loosely on the axle when the machine is in operation either as a rake or as a tedder.

At any time during the operation of the machine, either as a rake or as a tedder, the driver can readily make the desired adjustments of the reel, one of such adjustments being by means of the lever that controls the connections to the caster-wheels 17 whereby the reel-frame as a whole can be vertically adjusted at its rear end with respect to such caster-wheels, and the other adjustment being of the reel alone, and which independent adjustment of the reel is performed by a stroke of the hand lever 31 which will cause a movement up or down of the bearing 27 in the elongated opening 28 of the bracket 29, which bearing, as stated, supports the inner end of the reel-shaft. By reason of the character of the bearing for the outer or rear end of the shaft this last-named adjustment is permitted. In such independent adjustment of the reel-shaft, the inner or forward bearing 27 is moved in a slightly curved path which is the arc of a circle struck from the axis of the short diagonal shaft 43 and hence the pinion 52 on the reel-shaft is always maintained in proper engagement with the teeth of the internal gear 51, so that no matter in what position the forward or inner end of the reel-shaft may be adjusted to, the pinion 52 that it carries is always maintained in proper position to be driven by the rotation of the said internal gear 51.

What I claim as my invention and desire to secure by Letters Patent, is—

1. In a side-delivery rotary-rake, the combination of a wheeled support comprising a rotating axle, a diagonally-arranged frame in rear of said wheeled support and connected therewith, a rotatable reel in said frame comprising a shaft, two driving gears on said axle, two driven gears connected together and supported from said frame and in constant mesh with said driving gears, respectively, means for alternatively clutching said driving gears to the axle, and other gear devices connecting the reel-shaft with said driven gears.

2. In a side-delivery rotary-rake, the combination of a wheeled support comprising a rotating axle, a diagonally-arranged frame in rear of said wheeled support and connected therewith, a rotatable reel in said frame comprising a shaft, two driving gears on said axle, two driven gears connected together and supported from said frame and in constant mesh with said driving gears, respectively, means for alternatively clutching said driving gears to the axle, other gear devices connecting said reel-shaft with said driven gears, and means for vertically adjusting the forward end of the reel-shaft.

3. In a side-delivery rotary-rake, the combination of a wheeled support comprising a rotating axle, a diagonally-arranged frame in rear of said wheeled support and connected therewith, a rotatable reel in said frame comprising a shaft, two driving gears on said axle, two driven gears connected together and supported from said frame and in constant mesh with said driving gears, respectively, means for alternatively clutching said driving gears to the axle, other gear devices connecting said reel-shaft with said driven gears, and means for vertically adjusting the forward end of the reel-shaft, said adjusting means comprising a rack fixedly secured to the reel-frame, a toothed bearing for the forward end portion of the reel-shaft, means for holding the teeth of said bearing in engagement with said rack, and a lever connected with said bearing.

4. In a side-delivery rotary-rake, the combination of a wheeled support comprising a rotating axle, a diagonally-arranged frame in rear of said wheeled support and connected therewith, a rotatable reel in said frame comprising a shaft, two driving gears on said axle, two driven gears connected together and supported from said frame and also from said axle and in constant mesh with said driving gears, respectively, means for alternatively clutching said driving gears to the axle, and other gear devices connecting the reel-shaft with said driven gears.

5. In a side-delivery rotary-rake, the combination of a wheeled support comprising a rotating axle, a diagonally-arranged frame in rear of said wheeled support and connected therewith, a rotatable reel in said frame comrising a shaft, two driving gears on the axle, one being an external and the other an internal bevel gear, two driven bevel gears connected together and supported from said frame with their axes substantially parallel with the axis of the reel-shaft, each of said driven gears being in constant mesh with one of said driving gears, means for alternatively clutching said driving gears to the axle, and other gear means connecting the reel-shaft with said driven gears.

6. In a side-delivery rotary-rake, the combination of a wheeled support comprising a rotating axle, a diagonally-arranged frame in rear of said wheeled support and connected therewith, a rotatable reel in said frame comprising a shaft, two driving gears on the axle, one being an external and the other an internal bevel gear, a diagonal shaft extending rearwardly from said axle with its axis substantially parallel with the axis of the reel-shaft, two driven bevel gears connected together and mounted upon said diagonal shaft and respectively meshing with said driving gears, means for alternatively clutching said driving gears to the axle, and other gear means connecting the reel-shaft with said driven gears.

7. In a side-delivery rotary-rake, the combination of a wheeled support comprising a rotating axle, a diagonally-arranged frame in rear of said wheeled support and connected therewith, a rotatable reel in said frame comprising a shaft, two bevel gears connected together in axial alinement with each other but out of alinement with the axis of the reel-shaft, means carried by one of said gears for compelling a rotation of said reel-shaft, gears on said axle in mesh respectively with said first-mentioned gears, and means for alternatively clutching said axle gears to the axle to cause a driving of the first-mentioned gears and the reel-shaft connected therewith.

8. In a side-delivery rotary-rake, the combination of a wheeled support comprising a rotating axle, a diagonally-arranged frame in rear of said wheeled support and connected therewith, a rotatable reel in said frame comprising a shaft, two bevel gears connected together in axial alinement with each other but out of alinement with the axis of the reel-shaft, means carried by one of said gears for compelling a rotation of said reel-shaft, an internal bevel gear and an external bevel gear on the axle in mesh respectively with said first-mentioned gears, and means for alternatively clutching said axle gears to the axle to cause a driving of the first-mentioned gears and the reel-shaft connected therewith in either direction.

9. In a side-delivery rotary-rake, the combination of a wheeled support comprising a rotating axle, a diagonally-arranged frame in rear of said wheeled support and connected therewith, a rotatable reel in said frame comprising a shaft, two bevel gears connected together in axial alinement with each other but out of alinement with the axis of the reel-shaft, means carried by one of said gears for compelling a rotation of said reel-shaft, said means consisting of an internal gear formed with the rear one of said gears and a gear secured on the reel-shaft and meshing with said internal gear, an internal bevel gear and an external bevel gear on the axle in mesh respectively with said first-mentioned gears, and means for alternatively clutching said axle gears to the axle to cause a driving of the first-mentioned gears and the reel-shaft connected therewith in either direction.

10. In a side-delivery rotary-rake, the combination of a wheeled support comprising a rotating axle, a diagonally-arranged frame in rear of said wheeled support and connected therewith, a rotatable reel in said frame comprising a shaft, means for vertically adjusting the forward end of said shaft, two bevel gears connected together in axial alinement with each other but out of alinement with the axis of the reel-shaft, means carried by one of said gears for compelling a rotation of said reel-shaft in any of its adjusted positions, gears loosely mounted on said axle and in mesh respectively with said first-mentioned gears, one of said last-mentioned gears being an internal gear for driving said first-mentioned gears and the reel-shaft in one direction and the other of such gears being an external gear for driving the same members in the opposite direction, and means for alternatively clutching said axle gears to the axle.

11. In a side-delivery rotary-rake, the combination of a wheeled support comprising a rotating axle, a diagonally-arranged frame in rear of said wheeled support and connected therewith, a rotatable reel in said frame comprising a shaft, a vertically-adjustable bearing for the forward end of the shaft, a slotted guide-member supported by said frame and in the slot of which said bearing is adjustably secured, means for adjusting said bearing, a pinion secured to said shaft, an internal gear in mesh with said pinion on the shaft, a gear connected with said internal gear, and another gear on the axle for driving said last-mentioned gear and the internal gear and pinion in any adjusted position of the reel-shaft.

12. In a side-delivery rotary rake, the combination of a wheeled support comprising a rotating axle, a diagonally-arranged frame in rear of said wheeled support and connected therewith, a rotatable reel in said frame comprising a shaft, a vertically-adjustable bearing for the forward end of the shaft, a guide-member supported by the frame and having a curved slot therein into which said bearing projects, means for adjusting said bearing lengthwise of said slot to raise or lower said forward end of the shaft and at the same time impart to it a slight forward or back movement, a pinion secured to said shaft, an internal gear in mesh with said pinion on the shaft, a gear connected with said internal gear, and another gear on the axle for driving said last-mentioned gear and the internal gear and pinion in any adjusted position of the reel-shaft.

13. In a side-delivery rake, the combination of a wheeled support comprising a rotating axle, a gear on the axle, means for causing a clutching engagement of said gear to the axle, a diagonally-arranged frame in rear of said wheeled support and connected therewith, a rotatable reel in said frame comprising a shaft, a pinion on the forward end of said shaft, an internal gear with which said pinion is in mesh, a gear connected with said internal gear and meshing with the said gear on the axle, and means for moving the forward end of the reel-shaft in an arc of a circle about the axis of the said internal gear to vertically adjust such forward end of the shaft without disturbing the intermeshing of said pinion and internal gear.

14. In a side-delivery rake, the combination of a wheeled support comprising a rotating axle, a gear on the axle, means for causing a clutching engagement of said gear to the axle, a diagonally-arranged frame in rear of said wheeled support and connected therewith, a rotatable reel in said frame comprising a shaft, a second gear supported in meshing engagement with the said gear on the axle, other gearing interposed between said second gear and the reel-shaft and comprising a pinion and an internal gear, said last two members being in mesh with each other and one of them being fast to said second-named gear and the other fast to the reel-shaft, and means for vertically adjusting the forward end of the reel-shaft.

15. In a side-delivery rake, the combination of a wheeled support comprising a rotating axle, a gear on the axle, means for causing a clutching engagement of said gear to the axle, a diagonally-arranged frame in rear of said wheeled support and connected therewith, a rotatable reel in said frame comprising a shaft, a second gear supported in meshing engagement with the said gear on the axle, other gearing interposed between said second gear and the reel-shaft and comprising a pinion and an internal gear, said last two members being in mesh with each other and one of them being fast to said second-named gear and the other fast to the reel-shaft, and means for vertically adjusting the forward end of the reel-shaft, said adjusting means comprising a rack fixedly secured to the reel-frame, a toothed bearing for the forward end portion of the reel-shaft, means for holding the teeth of said bearing in engagement with said rack, and a lever connected with said bearing.

16. In a side-delivery rotary-rake, the combination of a wheeled support comprising a rotating axle, a diagonally-arranged frame in rear of said wheeled support and connected therewith, a rotatable reel in said frame comprising a shaft, two gears connected together in axial alinement with each other but out of alinement with the axis of the reel-shaft, an internal gear connected with the rear one of said two gears, a gear secured on the reel-shaft and in mesh with said internal gear, gears on the axle in operative engagement respectively with said two first-mentioned gears, means for alternatively clutching said axle gears to the axle to cause a driving of the said two first-mentioned gears and the reel-shaft in either direction, and means for vertically adjusting said reel-shaft by moving its forward end in an arc about the axis of said internal gear.

17. In a side-delivery rotary-rake, the combination of a wheeled support comprising a rotating axle, a diagonally-arranged frame in rear of said wheeled support and connected therewith, a rotatable reel in said frame comprising a shaft, two gears connected together in axial alinement with each other but out of alinement with the axis of the reel-shaft, an internal gear connected with the rear one of said two gears, a gear secured on the reel-shaft and in mesh with said internal gear, gears on the axle in operative engagement respectively with said two first-mentioned gears, means for alternatively clutching said axle gears to the axle to cause a driving of the said two first-mentioned gears and the reel-shaft in either direction, and means for vertically adjusting said reel-shaft by moving its forward end in an arc about the axis of said internal gear, said last-named means comprising a short fixed rack depending from the reel-frame, a toothed bearing for the forward end portion of the reel-shaft, means for holding the teeth of such bearing in engagement with said rack, and a lever for rotating said bearing.

18. In a side-delivery rotary-rake, the combination of a wheeled support comprising a rotating axle, a diagonally-arranged frame in rear of said wheeled support and connected therewith, a rotatable reel in said frame comprising a shaft, two gears connected together in axial alinement with each other but out of alinement with the axis of the reel-shaft, an internal gear connected with the rear one of said two gears, a gear secured on the reel-shaft and in mesh with said internal gear, gears on the axle in operative engagement respectively with said two first-mentioned gears, means for alternatively clutching said axle gears to the axle to cause a driving of the said two-first mentioned gears and the reel-shaft in either direction, and means for vertically adjusting said reel-shaft by moving its forward end in an arc about the axis of said internal gear, said last-named means comprising a slotted bracket depending from the reel-frame and having its rear edge curved and provided with teeth to form a rack, a bearing for the reel-shaft located in and movable longitudinally of the slot in said bracket and having teeth for engagement with said rack, and a lever for rotating said bearing.

19. In a side-delivery rotary-rake, the combination of a wheeled support comprising a rotating axle, a diagonally-arranged frame in rear of said wheeled support and connected therewith, a rotatable reel in said frame comprising a shaft, two driven members interposed between the axle and the frame, means connecting said driven members with the shaft, two driving members loosely mounted on the axle in constant engagement with said driven members, and means for alternatively clutching said driving members to the axle, the engagement of the driving members with the driven members being such as to cause the said driven members and the reel-shaft to be rotated in one direction when one driving member is clutched to the axle and to be rotated in the opposite direction when the other driving member is clutched to the axle.

20. In a combined rotary-rake and tedder, the combination of a wheeled support comprising a rotating axle, a diagonally-arranged frame in rear of said wheeled support and connected therewith, a rotatable reel in said frame comprising a shaft, two driven gears interposed between the axle and the frame, means connecting said driven gears with the shaft, two driving gears loosely mounted on the axle and in constant engagement with said driven gears and adapted to rotate said driven gears in opposite directions, two sliding clutch members on the axle adapted to engage respectively with said driving gears, and means for alternatively shifting said clutch-members into engagement with the gears on the axle, said means comprising a longitudinally-movable bar connected with both of said clutch members, a block pivoted eccentrically to said said bar, a fixed support against which said block bears, and means for turning said block to different positions against said support to cause an endwise movement of the bar.

21. In a combined rotary-rake and tedder, the combination of a wheeled support comprising a rotating axle, a diagonally-arranged frame in rear of said wheeled support and connected therewith, a rotatable reel in said frame comprising a shaft, two driven gears interposed between the axle and the frame, means connecting said driven gears with the shaft, two driving gears loosely mounted on the axle and in constant engagement with said driven gears and adapted to rotate said driven gears in opposite directions, two sliding clutch members on the axle adapted to engage respectively with said driving gears, and means for alternatively shifting said clutch-members into engagement with the gears on the axle, said means comprising a longitudinally-movable bar connected with both of said clutch members, a block pivoted eccentrically to said bar, a fixed support against which said block bears, and a lever connected with said block for turning it into different positions with respect to said fixed support.

22. In a combined rotary-rake and tedder, the combination of a wheeled support comprising a rotating axle, a diagonally-arranged frame in rear of said wheeled support and connected therewith, a rotatable reel in said frame comprising a shaft, two driven gears interposed between the axle and the frame, means connecting said driven gears with the shaft, two driving gears loosely mounted on the axle and in constant engagement with said driven gears and adapted to rotate said driven gears in opposite directions, two sliding clutch members on the axle adapted to engage respectively with said driving gears, and means for alternatively shifting said clutch-members into engagement with the gears on the axle, said means comprising a longitudinally-movable bar connected with both of said clutch members, a block pivoted eccentrically to said bar, a fixed support against which said block bears, a lever pivotally connected with said block for turning it into different positions with respect to said fixed support, and means for adjustably locking said lever to the block.

23. In a combined rotary-rake and tedder, the combination of a wheeled support comprising a rotating axle, a diagonally-arranged frame in rear of said wheeled support and connected therewith, a rotatable reel in said frame comprising a shaft, two driven gears interposed between the axle and the frame, means connecting said driven gears with the shaft, two driving gears loosely mounted on the axle and in constant engagement with said driven gears and adapted to rotate said driven gears in opposite directions, two sliding clutch members on the axle adapted to engage respectively with said driving gears, and means for alternatively shifting said clutch-members into engagement with the gears on the axle, said means comprising a longitudinally-movable bar connected with both of said clutch members, a block pivoted eccentrically to said bar, a fixed support against which said block bears, means for turning said block to different positions against said support to cause an endwise movement of the bar, and means for locking the block against lateral movement.

24. In a combined rotary-rake and tedder, the combination of a wheeled support comprising a rotating axle, a diagonally-arranged frame in rear of said wheeled support and connected therewith, a rotatable reel in said frame comprising a shaft, two driven gears interposed between the axle and the frame, means connecting said driven gears with the shaft, two driving gears loosely mounted on the axle and in constant engagement with said driven gears and adapted to rotate said driven gears in opposite directions, two sliding clutch members on the axle adapted to engage respectively with said driving gears, and means for alternatively shifting said clutch-members into engagement with the gears on the axle, said means comprising a longitudinally-movable bar connected with both of said clutch members, a block pivoted eccentrically to said bar, a fixed support against which said block bears, a lever pivotally connected with said block for turning it into different positions with respect to said fixed support, and a notched rack carried by said block for adjustably connecting the lever to the block.

25. In a combined rotary-rake and tedder, the combination of a wheeled support comprising a rotating axle, a diagonally-arranged frame in rear of said wheeled support and connected therewith, a rotatable reel in said frame comprising a shaft, two driven gears interposed between the axle and the frame, means connecting said driven gears with the shaft, two driving gears loosely mounted on the axle and in constant engagement with said driven gears and adapted to rotate said driven gears in opposite directions, two sliding clutch members on the axle adapted to engage respectively with said driving gears, and means for alternatively shifting said clutch members into engagement with the gears on the axle, said means comprising a longitudinally-movable bar connected with both of said clutch members, a block formed of two separated side walls connected together by an end wall between which side walls an end portion of said bar extends, a pivot passing eccentrically through said side walls and also passing through an eye in the bar, a lever mounted on said pivot and means for adjustably locking said lever to the block.

26. In a combined rotary-rake and tedder, the combination of a wheeled support comprising a rotating axle, a diagonally-arranged frame in rear of said wheeled support and connected therewith, a rotatable reel in said frame comprising a shaft, two driven gears interposed between the axle and the frame, means connecting said driven gears with the shaft, two driving gears loosely mounted on the axle and in constant engagement with said driven gears and adapted to rotate said driven gears in opposite directions, two sliding clutch members on the axle adapted to engage respectively with said driving gears, and means for alternatively shifting said clutch members into engagement with the gears on the axle, said means comprising a longitudinally-movable bar connected with both of said clutch members, a block formed of two separated side walls connected together by an end wall between which side walls an end portion of said bar extends, a pivot passing eccentrically through said side walls and also passing through an eye in the bar, a lever mounted on said pivot, means carried by said block for adjustably locking said lever to the block, and a projection extending from said support between the walls of the block to prevent lateral movement of the block and axial rotation of the bar.

ROBERT R. BOWERS.